May 2, 1961 S. RAPPAPORT ET AL 2,982,899
PRESSURE SENSITIVE CONTOUR FOLLOWER
Filed Dec. 15, 1958 8 Sheets-Sheet 1
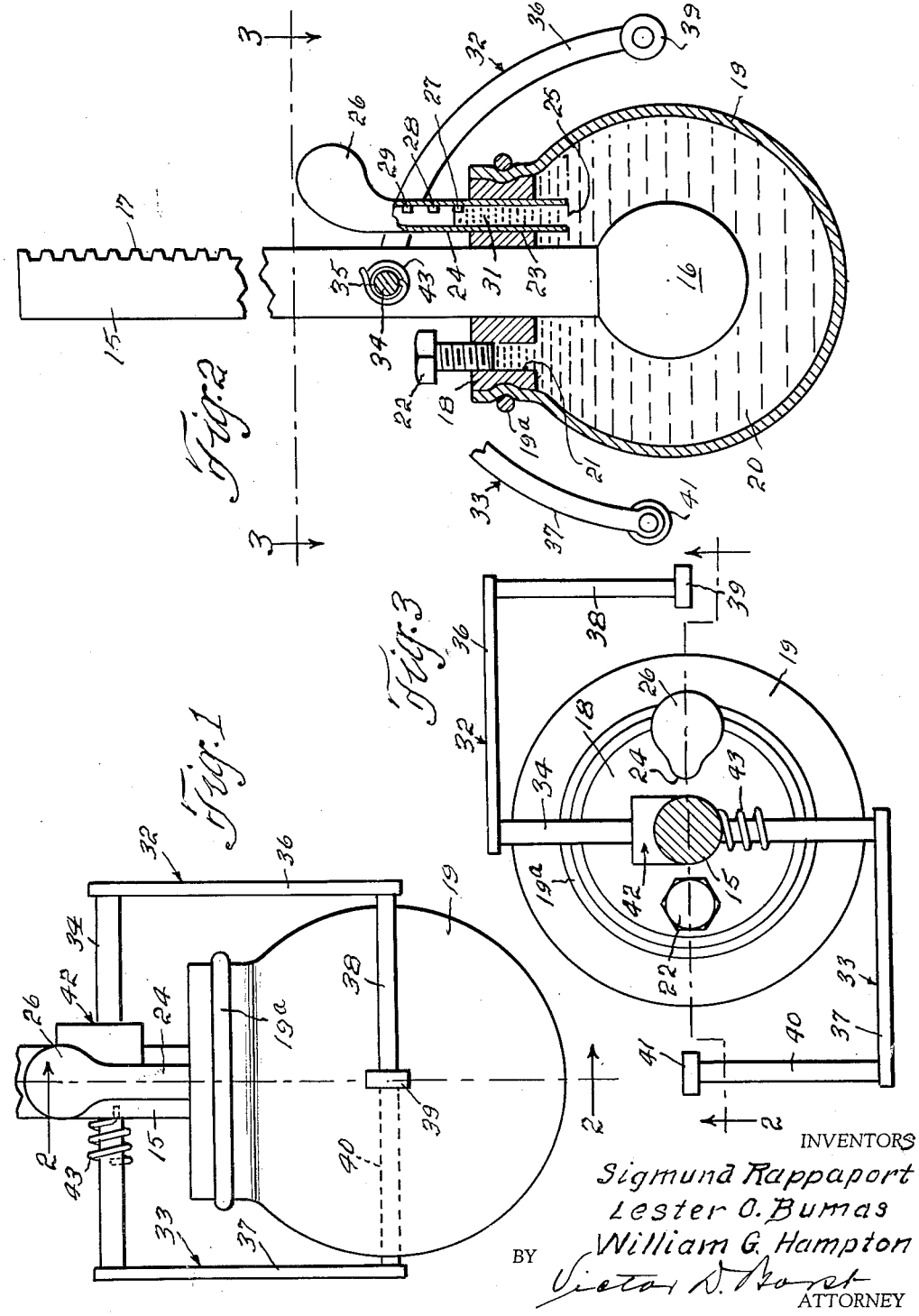
INVENTORS
Sigmund Rappaport
Lester O. Bumas
William G. Hampton
BY
ATTORNEY

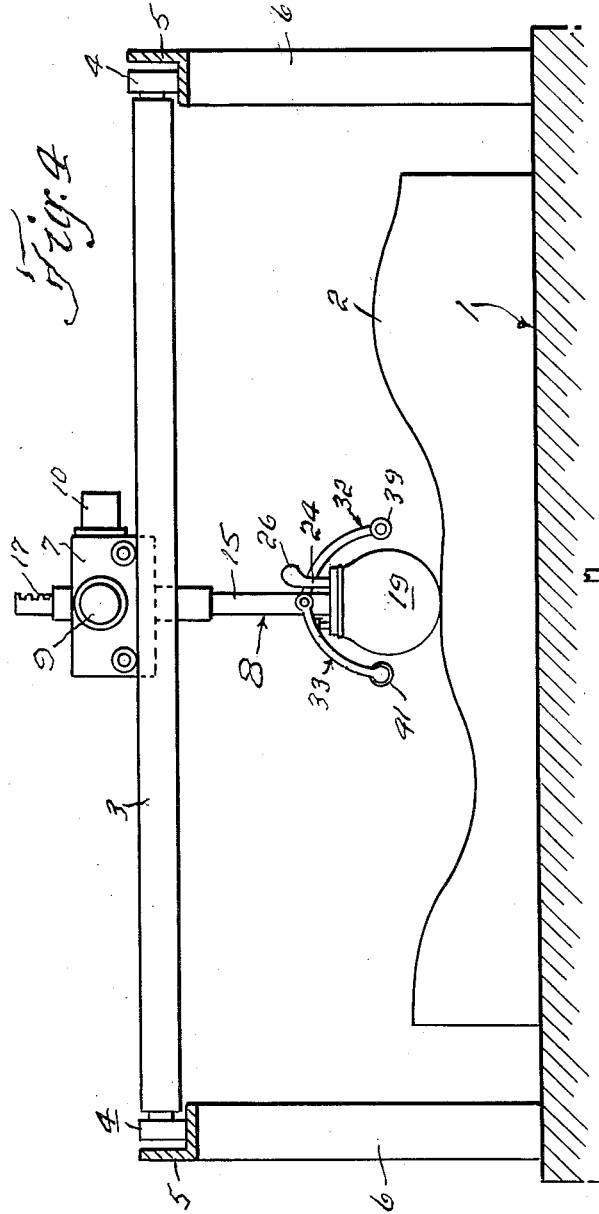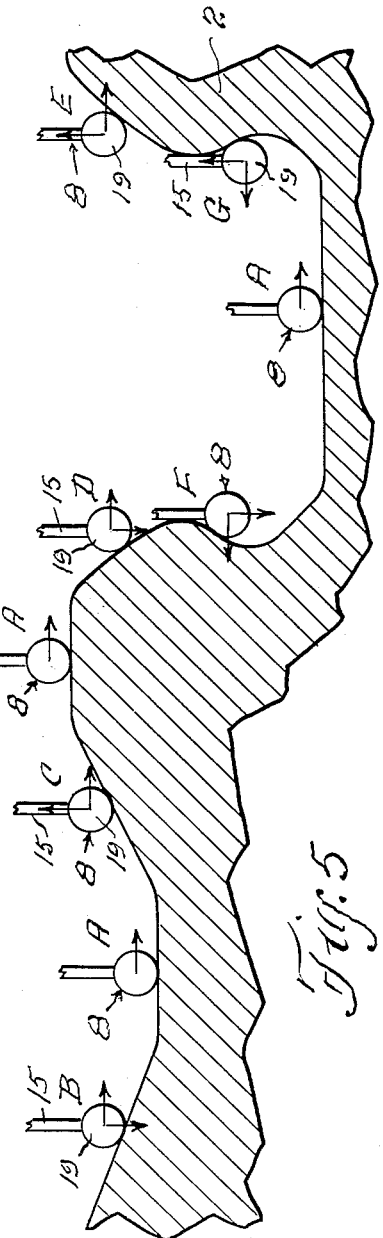

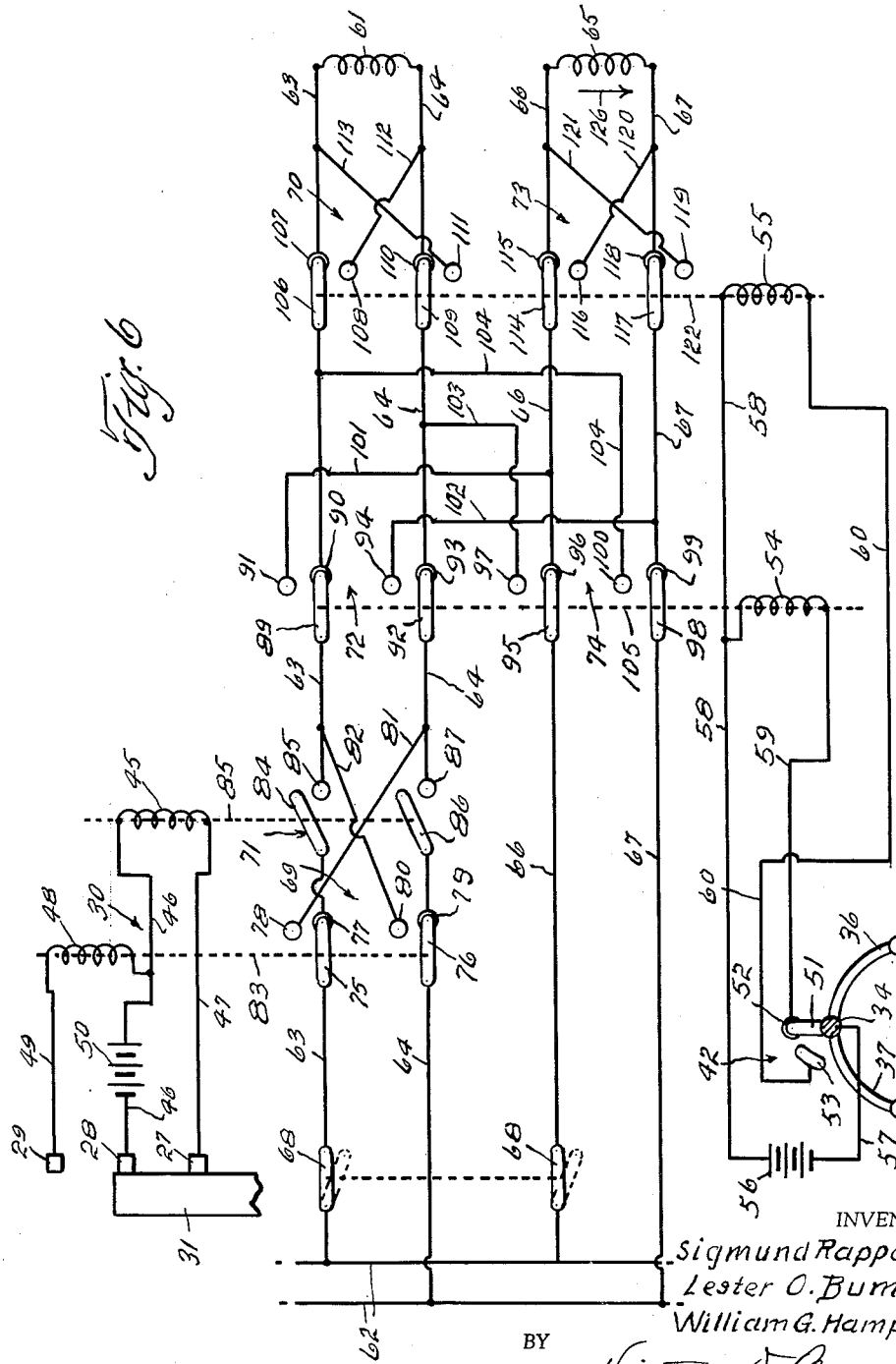

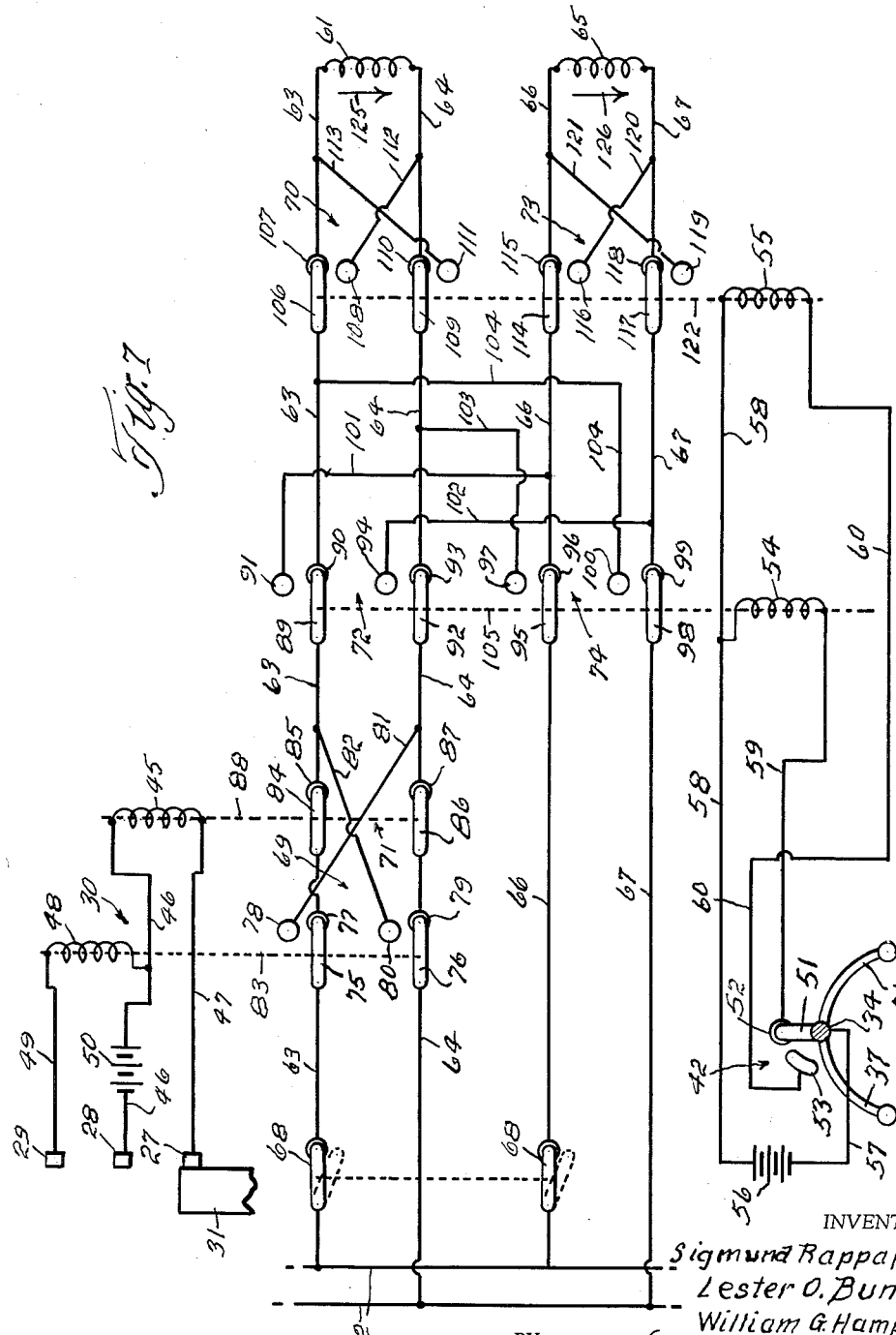

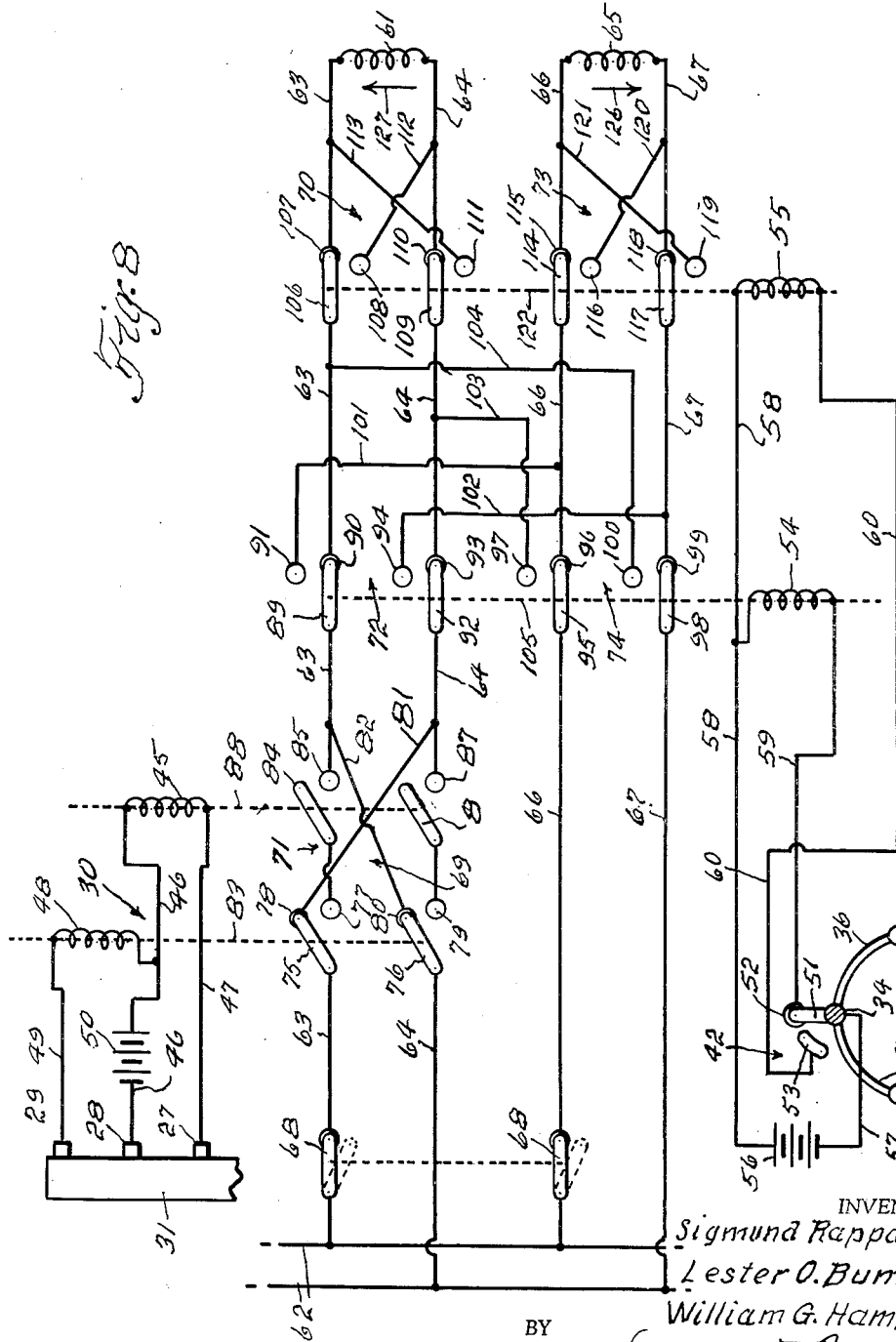

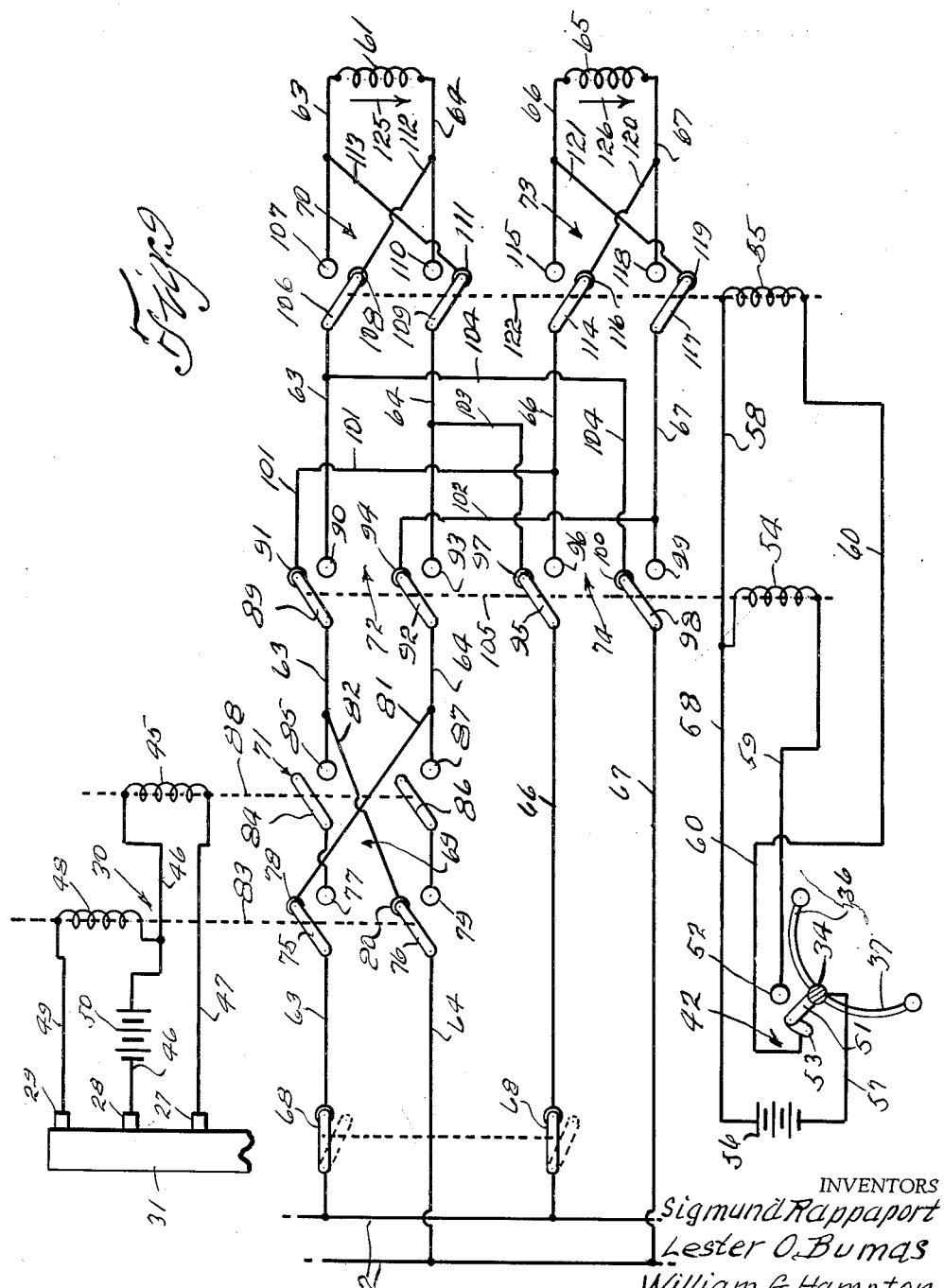

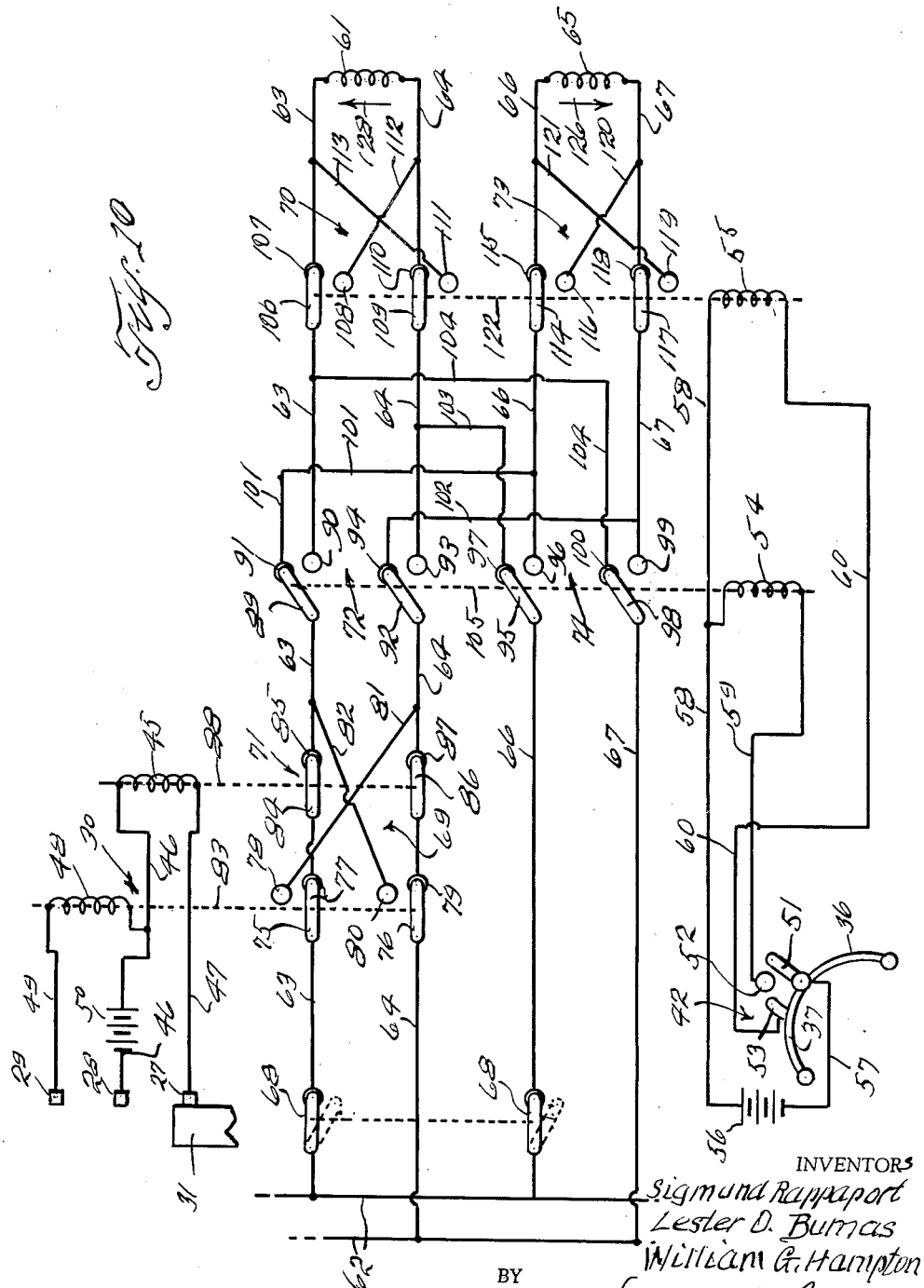

United States Patent Office 2,982,899
Patented May 2, 1961

2,982,899

PRESSURE SENSITIVE CONTOUR FOLLOWER

Sigmund Rappaport, Port Washington, Lester O. Bumas, Rego Park, and William G. Hampton, Bayside, N.Y., assignors to Sperry Rand Corporation, Ford Instrument Company Division, Wilmington, Del., a corporation of Delaware Filed Dec. 15, 1958, Ser. No. 780,425

5 Claims. (Cl. 318—162)

This invention relates to a method of and apparatus for automatically duplicating three-dimensional models, especially models made of soft material such as clay, without distortion or deforming of the model.

The mechanism includes, as the principal element thereof, a pressure sensitive contour follower, which during operation is maintained in contact with the surface of the model under a pressure which is so small as not to deform the model, but yet is such that it is capable of sensitively transmitting information regarding the shape of the model.

The contour follower comprises a hollow mercury filled flexible sphere which is secured to the lower end of an elongated actuating stem. A vertically disposed hollow tube, having three vertically spaced contacts therein, is carried by the actuating stem with the lower open end thereof disposed within the sphere. When pressure is applied to the outer surface of the sphere the volume of the sphere is decreased which forces the mercury in the sphere up into the hollow tube into engagement with one or more of the contacts therein, depending on the amount of pressure applied to the sphere.

The contour follower is mounted upon and depends from a carriage which is mounted for transverse movement above a table or other suitable support on which the model to be duplicated is secured. The contour follower is adapted to be moved longitudinally by the carriage, in straight contour paths with the sphere in contact with the model. After one contour path has been traversed by the contour follower the carriage is shifted transversely of the model and the contour follower moved longitudinally along successive adjacent contour paths. The upper end of the actuating stem of the contour follower is provided with a rack which extends up through a suitable transmission housing which is mounted upon the carriage for longitudinal movement therewith. The transmission housing is provided with two servo motors, one of which is operative to move the carriage and transmission housing longitudinally of a model thereunder at a constant or variable speed as determined by the operator, and the other of which is operative to raise and lower the contour follower vertically with respect to the model being duplicated in accordance with the contour being traversed depending on whether insufficient or excessive pressure is applied to the contour follower. The result is that the contour follower closely follows the model surface with extremely low pressure contact. The operations of the two servo motors are controlled by the contour follower in accordance with what combination of switches in the hollow tube are contacted by the mercury being forced up into the tube, which in turn is dependent upon the pressure being applied to the outer surface of the contour follower sphere. The outputs of the contour follower are also fed into a servo loop by which the operation of the duplicating means is controlled, which duplicating means may be a clay cutter, a plotting board or a die cutter. The servo loop is also operative through suitable encoders to impart the information, transmitted by the contour follower, to a tape recorder by which the clay cutter, the plotting board, and/or the die cutter may be operated at future times.

The principal object of the invention is to provide a new and improved method of and apparatus for accurately duplicating three-dimensional models in less time and with less skilled labor than is required with prior known duplicating means of this character.

Another object of the invention is to provide a method and apparatus of the aforesaid character by which models of soft material such as clay can be accurately and quickly duplicated without injury to the models.

Another object of the invention is to provide a method and apparatus of the aforesaid character by which the data determining the outline of a three-dimensional model may be stored in a tape recorder or other memory device for use at some future time in duplicating the model by a clay cutter, a plotting board and/or a die cutter.

Another object of the invention is to provide a method and apparatus of the aforesaid character by which a clay cutter, a plotting board, or a die cutter may be individually or simultaneously operated in duplicating a model.

Still another object of the invention is to provide a duplicating apparatus for three-dimensional models in which the operation thereof is controlled in accordance with varying pressures exerted on a model, being duplicated, by a pressure sensitive contour follower.

Having stated the principal objects of the invention, other and more limited objects thereof will be apparent from the following specification and the accompanying drawings forming a part thereof, in which:

Fig. 1 is a side elevation of the sensor used in connection with my new and improved method of and apparatus for duplicating three-dimensional models;

Fig. 2 is a central vertical section taken on the line 2—2 in Fig. 1;

Fig. 3 is a horizontal section taken on the line 3—3 of Fig. 2;

Fig. 4 is a diagrammatic view in elevation illustrating the manner in which the sensor is mounted above a model for longitudinal and transverse movement with respect thereto;

Fig. 5 is a fragmentary enlarged diagrammatic sectional view showing one contour of a model, which view is to be used in connection with the description of the operation of the control mechanism shown in Figs. 6 to 10;

Figure 11:
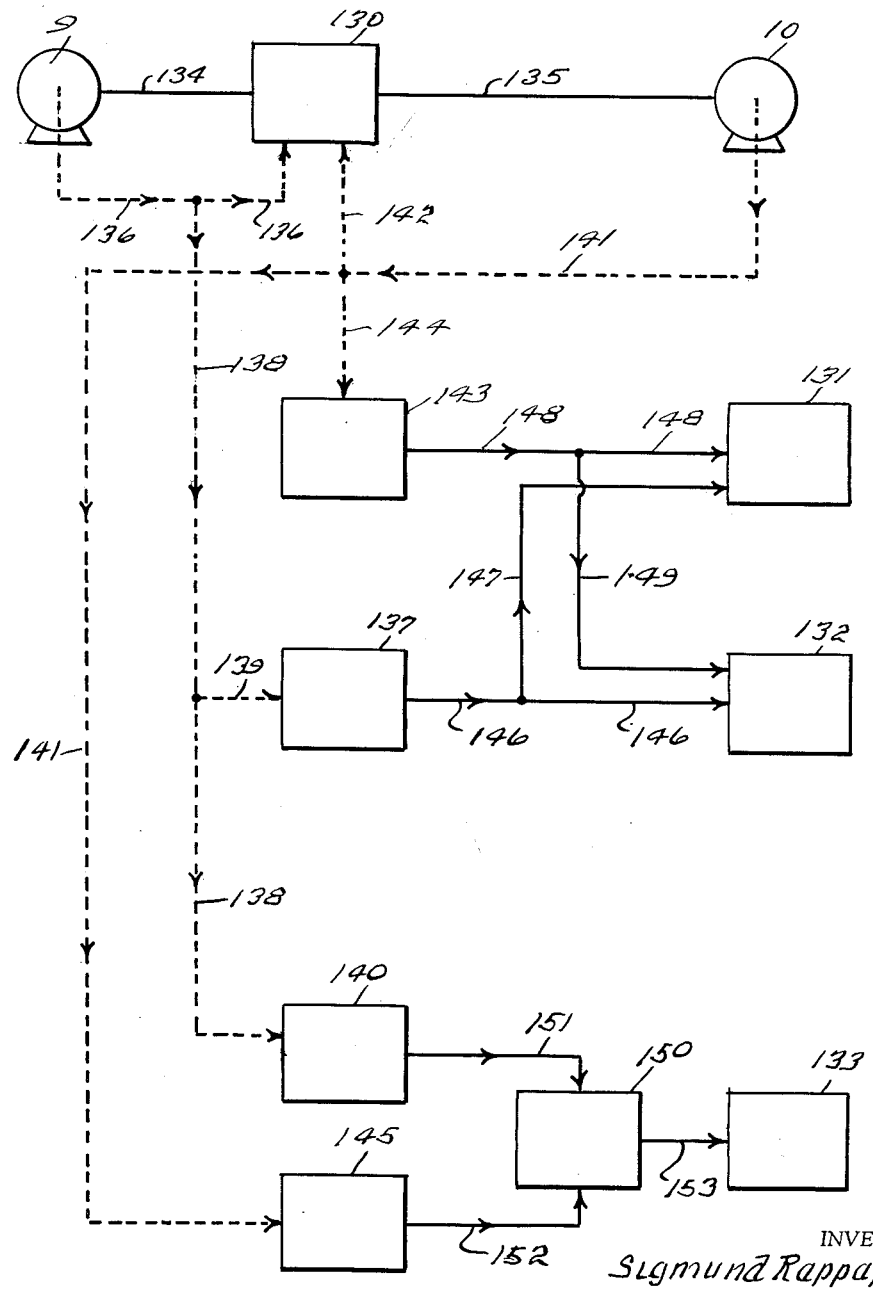

Fig. 6 is a wiring diagram of the control mechanism for the two motors by which the contour follower is moved vertically and longitudinally, which mechanism includes various switches which are actuated by the contour follower in accordance with variations in the contour of the model being traversed and the position of the contour follower with respect thereto, this view showing the setting of the various switches when the contour follower is being moved forwardly along a horizontal path as indicated at "A" in Fig. 5;

Fig. 7 is a view similar to Fig. 6 showing the setting of the various switches when the contour follower is being moved forwardly and downwardly at an angle of less than 45°, with respect to the horizontal, as indicated at "B" in Fig. 5;

Fig. 8 is a view similar to Fig. 6 showing the setting of the various switches when the contour follower is being moved forwardly and upwardly at an angle of less than 45°, with respect to the horizontal, as indicated at "C" in Fig. 5;

Fig. 9 is a view similar to Fig. 6 showing the setting of the various switches when the contour follower is being moved forwardly and downwardly at an angle of 45° or greater, with respect to the horizontal, as shown at "D" in Fig. 5;

Fig. 10 is a view similar to Fig. 6 showing the setting of the various switches when the contour follower is being moved forwardly and upwardly at an angle of 45° or greater, with respect to the horizontal, as shown at "E" in Fig. 5; and Fig. 11 is a block diagram illustrating the manner in which the duplicating means is actuated in accordance with the mechanical output of the two motors, and also the manner in which the information transmitted by the contour follower is imparted to a tape recorder or similar memory device for storage and use at some future time.

Referring now to the drawing by reference characters, the numeral 1 indicates a bed on which a model to be duplicated is adapted to be secured. A transversely movable frame 3 is mounted above the bed 1 by means of rollers 4 which are adapted to ride on rails 5 secured to the upper ends of suitable supporting means 6 which, as shown herein, are secured to and extend upwardly from the bed 1. Obviously the supporting means 6 need not be secured to the bed 1, as they could equally well be secured to any suitable base. A carriage 7 is suitably mounted in any convenient manner upon the frame 3 for back and forth movement thereon in a straight path. The carriage 7 has a depending vertically reciprocal pressure sensitive contour follower, generally indicated by the numeral 8, mounted therein which is adapted to be maintained in pressure engaging contact with the surface of the model 2 during operation. The contour follower 8 is adapted to be maintained in pressure engaging contact with the surface of the model 2 and to be moved up and down in accordance with variations in the contour of the model by a servo motor 10 through other suitable transmission gearing, also not shown. The operation of the servo motors 9 and 10 is controlled by the contour follower 8, through suitable mechanism to be described hereinafter, in accordance with variations in the contour of the model and the position of the contour follower with respect thereto.

The contour follower 8 comprises an elongated actuating stem 15 the lower end of which terminates in a ball 16 and the upper end of which is provided with a rack 17 through which the contour follower is raised and lowered by the motor 10. The stem 15 is provided with an annular collar 18 which is rigidly secured thereto slightly above the ball 16. A hollow sphere 19 of thin flexible material which is disposed about the ball 16, preferably concentric therewith, is secured to the collar 18 by a clamping ring 19a. The sphere 19 is completely filled with mercury 20 about the ball 16 which is provided to minimize the amount of mercury needed and thus to minimize the thermal effects. The mercury may be inserted into the sphere 19 through a threaded aperture 21, in the collar 18, which is closed by an adjusting screw 22. The collar 18 is also provided with an aperture 23 in which a hollow tube 24 is rigidly secured with the lower open end 25 thereof disposed within the mercury 20 within the sphere 19, and the upper end thereof terminating in a closed spherical expansion chamber 26. Three vertically spaced contacts 27, 28 and 29, which constitute part of a switching mechanism 30, are secured in fixed position within the hollow tube 24 with the lowermost contact 27 disposed above the top of the collar 18. The initial, or normal height, of the column 31 of mercury 20 within the tube 24 is at the contact 27 when the sphere 19 has not been deformed by pressure being applied thereto. This height can be regulated by the adjusting screw 22. When the sphere 19 is deformed by pressure being applied thereto the column 31 of mercury is forced further up into the tube 24 into bridging engagement with the contact 28, or both the contacts 28 and 29 depending upon the amount of pressure applied to the sphere 19.

The contour follower 8 is also provided with a pair of mechanical feelers 32 and 33 which are secured to opposite ends of a transversely extending shaft 34 which is rotatably mounted in an aperture 35 in the stem 15. The feeler 32 comprises an arcuate arm 36 which extends downwardly and forwardly from the shaft 34 at one side of the sphere 19, and the feeler 33 comprises a similar arcuate arm 37 which extends downwardly and rearwardly from the shaft 34 at the opposite side of the sphere 19. The lower end of the arm 36 is provided with a rod 38 which is disposed parallel to the shaft 34 and has a roller 39 mounted over the free end thereof; and the lower end of the arm 37 is provided with an oppositely extending rod 40 which is disposed parallel to the shaft 34 and has a roller 41 mounted on the free end thereof. The rollers 39 and 41 are disposed in a vertical plane passing through the axis of the stem 19 perpendicular to the axis of the shaft 34 as shown in Fig. 3. When the contour follower 8 is being moved forwardly and upwardly at an angle of 45° or greater, with respect to the horizontal, the arm 36, of the feeler 32, and the shaft 34 are adapted to be rotated clockwise as viewed in Fig. 2; and when the contour follower is being moved forwardly and downwardly at an angle of 45° or greater, with respect to the horizontal, the arm 37 of the feeler 33 and the shaft 34 are adapted to be rotated counterclockwise as viewed in Fig. 2. Rotation of the shaft 34 in either direction from normal at rest position will actuate a supplemental switching mechanism 42 which will then cooperate with the switching mechanism 30 in controlling operation of the apparatus. Suitable means such as a spring 43 is provided for returning the feelers 32 and 33 to their normal position, shown in Fig. 2 after actuation.

The switching mechanism 30 comprises a relay 45, which is connected across the contacts 27 and 28 by conductors 46 and 47, and a relay 48, which is connected across the contacts 28 and 29, by the conductor 46 and a conductor 49. A voltage source 50 is interposed in the conductor 46. The supplemental switching mechanism 42 comprises a switch arm 51 which is connected in the shaft 34, a pair of contacts 52 and 53, a pair of relays 54 and 55, and a voltage source 56. The switch arm 51 is connected to one side of the voltage source 56 by a conductor 57, and the relays 54 and 55 are connected to the other side of the voltage source by a conductor 58. The relay 54 is connected to the contact 52 by a conductor 59, and the relay 55 is connected to the contact 53 by a conductor 60.

Current is supplied to the field winding 61 of the servo motor 10, by which the contour follower is raised and lowered, from the line 62 through a pair of conductors 63 and 64; and to the field winding 65 of the servo motor 9, by which the contour follower is moved longitudinally, by a pair of conductors 66 and 67. A manually actuated master control switch 68 is provided in the conductors 63 and 66. A pair of reversing switches 69 and 70, a stop switch 71, and a shift switch 72 are interposed in the conductors 63 and 64. The stop switch 71 is disposed beyond the reversing switch 69 and the shift switch 72 is disposed between the stop switch 71 and the reversing switch 70. A reversing switch 73 similar to the reversing switch 70, and a shift switch 74 similar to the shift switch 72, are interposed in the conductors 66 and 67 with the shift switch 74 disposed ahead of the reversing switch 73. The reversing switch 69 is adapted to be actuated by the relay 48 of the switching mechanism 30, and the stop switch 71 is adapted to be actuated by the relay 45 thereof. The shift switches 72 and 74 are adapted to be simultaneously actuated by the relay 54 of the supplemental switching mechanism 42, and the reversing switches 70 and 73 are adapted to be simultaneously actuated by the relay 55 of the supplemental switching mechanism 42.

The reversing switch 69 comprises the switch arms 75 and 76, the contacts 77 and 78 associated with the arm 75, and the contacts 79 and 80 associated with the arm 76. The contact 77 is interposed in the conductor 63 and the contact 79 is interposed in the conductor 64. The contact 78 is connected to the conductor 64 beyond the stop switch 71 by a jumper 81, and the contact 80 is connected to the conductor 63 beyond the stop switch 71 by a jumper 82. The switch arms 75 and 76 are connected together and are adapted to be simultaneously moved back and forth between their associated contacts by the relay 48 through suitable connecting means 83.

The stop switch 71 comprises the switch arm 84 associated with the contact 85 interposed in the conductor 63, and the switch arm 86 associated with the contact 87 interposed in the conductor 64. The switch arms 84 and 86 are connected together for simultaneous movement into and out of engagement with their associated contacts by the relay 45 through suitable connecting means 88.

The shift switch 72 comprises the switch arm 89 with the associated contacts 90 and 91, and the switch arm 92 with the associated contacts 93 and 94. The shift switch 74 comprises the switch arm 95 with the associated contacts 96 and 97, and the switch arm 98 with the associated contacts 99 and 100. The contact 90 is interposed in the conductor 63, and the contact 91 is connected to the conductor 66 beyond the switch 74 by a jumper 101. The contact 93 is interposed in the conductor 64, and the contact 94 is connected to the conductor 67 beyond the switch 74 by a jumper 102. The contact 96 is interposed in the conductor 66 and the contact 97 is connected to the conductor 64 beyond the switch 72 by a jumper 103. The contact 99 is interposed in the conductor 67 and the contact 100 is connected to the conductor 63 beyond the switch 72 by a jumper 104. The switch arms 89, 92, 95 and 98 are all connected together for simultaneous back and forth movement between their associated contacts by the relay 54 through suitable connecting means 105.

The reversing switch 70 comprises the switch arm 106 with the associated contacts 107 and 108, and the switch arm 109 with the associated contacts 110 and 111. The contact 107 is interposed in the conductor 63, and the contact 108 is connected to the conductor 64 by a jumper 112. The contact 110 is interposed in the conductor 64, and the contact 111 is connected to the conductor 63 by a jumper 113.

The revesing switch 73 comprises the contact arm 114 with the associated contacts 115 and 116, and the switch arm 117 with the associated contacts 118 and 119. The contact 115 is interposed in the conductor 66 and the contact 116 is connected to the conductor 67 by a jumper 120. The contact 118 is interposed in the conductor 67, and the contact 119 is connected to the conductor 66 by a jumper 121. The switch arms 106, 109, 114 and 117 are all connected together for simultaneous back and forth movement between their associated contacts by the relay 55 through suitable connecting means 122.

The operation of the apparatus under control of the contour follower 8 will now be described in detail, reference being had to Figs. 5 to 11 of the drawings. As previously stated, in operation the contour follower 8 is successively moved across a model, to be duplicated, in successive straight longitudinally extending adjacent contour paths by the servo motor 9, during which movement the contour follower is maintained in pressure engaging contact with the surface of the model and is raised and lowered vertically by the servo motor 10. The pressure with which the contour follower engages the surface of the model determines the height of the column 31 of mercury in the tube 24, and the height of the column 31 controls the operation of the apparatus. And the pressure with which the contour follower engages the surface of the model varies in accordance with the vertical movement of the contour follower during longitudinal movement thereof. If the contour follower is being moved forwardly and downwardly at an angle of less than 45° the pressure is at a minimum and the height of the column 31 is in its lowermost position in engagement only with the contact 27, as shown in Fig. 7. If the contour follower is being moved forwardly and upwardly at an angle of less than 45°, the pressure is at a maximum and the column 31 is in its uppermost position engaging and bridging all three contacts 27, 28 and 29, as shown in Fig. 8. And if the contour follower is being moved forwardly horizontally the pressure is medial and the height of the column is in mid-position engaging and bridging only the contacts 27 and 28, as shown in Fig. 6.

If the contour follower 8 is being moved generally forwardly and downwardly at an angle of 45° or greater, the pressure under some conditions of the contour is at a maximum and the column 31 is at an uppermost position engaging and bridging all three contacts 27, 28 and 29, and under other conditions of the contour, the pressure is at a minimum and the column 31 is in a lowermost position, engaging only the contact 27; and if the contour follower 8 is being moved generally forwardly and upwardly at an angle of 45° or greater, the pressure under certain conditions of the contour is at a minimum and the column 31 is in a lowermost position engaging only the contact 27, and under other conditions of the contour, the pressure is at a maximum and the column 31 is in an uppermost position engaging and bridging all three contacts 27, 28 and 29. Therefore when the contour follower is being moved forwardly and upwardly or downwardly at angles of less than 45° the servo motor 9 is being constantly rotated in a direction to advance the contour follower 8 forwardly and the motor 10 is rotated in a direction to alternately move the contour follower up and down. And when the contour follower 8 is being moved generally forwardly and upwardly at an angle of 45° or greater, the servo motor 10 is being rotated in a direction to constantly move the contour follower upwardly and the servo motor 9 is rotated in directions to alternately move the contour follower longitudinally forwardly and backwardly. When the contour follower 8 is being moved forwardly and upwardly or downwardly at angles of less than 45° the direction of rotation of the motor 9 is controlled by the switching mechanism 30. This shifting of the switching mechanism 30 from the motor 10 to the motor 9 is accomplished by the supplemental switching mechanism 42.

Reference will now be had to Fig. 7, which shows the various switching mechanisms set in condition for effecting forward and downward movement of the contour follower at an angle of less than 45°, as indicated at "B" in Fig. 5. The pressure upon the sphere 19 is therefore at a minimum and the column 31 is in a lowermost position engaging only the contact 27. The relays 45 and 48 are therefore deenergized so that the stop switch 71 and the reversing switch 69 remain in the positions shown. And since the supplemental switching mechanism 42 is only actuated when the contour follower is moving upwardly or downwardly at an angle of 45° or greater, the switching mechanism remains at its at rest position as shown, in which the relay 54 is energized and the relay 55 is deenergized. Current will therefore flow from one side of the line 62 straight through the conductor 63 to the winding 61 of the motor 10, thence through the winding 61 in the direction indicated by the arrow 125, and straight through the conductor 64 back to the other side of the line 62. The motor 10 will therefore rotate in a direction to move the contour follower downwardly. At the same time current will flow from one side of the line 62 straight through the conductor 66 to the winding 65 of the motor 9, thence through the winding 65 in the direction indicated by the arrow 125, and straight through the conductor 67 back to the other side of the line 62. The motor 9 will therefore rotate in a direction to move the contour follower longitudinally forwardly.

Fig. 6 shows the various switching mechanisms set in condition for effecting forward movement of the contour follower 8 in a horizontal path as indicated at "A" in Fig. 5. The pressure upon the sphere is medial, so that the column 31 is in mid-position engaging and bridging the contacts 27 and 28, which energizes the relay 45 and opens the stop switch 71. Otherwise the mechanism remains in the condition shown in Fig. 7. Current is therefore cut off from the motor 10, which remains stationary, but is supplied to the motor 9 in the same manner as shown and described in connection with Fig. 7. The contour follower is therefore moved forwardly but not vertically. Whenever the contour follower leaves any angularly disposed section onto a straight section the mechanism automatically resets to the condition shown in Fig. 6.

Fig. 8 shows the various switching mechanisms set in condition for effecting forward and upward movement of the contour followers at an angle of less than 45° as indicated at "C" in Fig. 5. The pressure upon the sphere 19 is now at a maximum so that the column 31 is in an uppermost position engaging and bridging all three contacts 27, 28 and 29, thereby energizing the relays 45 and 48 which opens the stop switch 71 and shifts the reversing switch 69 from the position shown in Figs. 6 and 7 to the position shown in Fig. 8. Otherwise the mechanism remains in the condition shown in Figs. 6 and 7. Current now flows from one side of the line through conductor 63, switch arm 75, jumper 81 and conductor 64 to the winding 61 of the motor 10, thence through the winding 61 in a reverse direction as indicated by the arrow 127, and back to the other side of the line 62 through the conductor 63, jumper 82, switch arm 76, and conductor 64. The motor 10 therefore rotates in the reverse direction, raising the contour follower. The opening of the stop switch 71 has no effect, one way or the other, upon the operation under this condition, since the jumpers 81 and 82 are connected to the conductors 64 and 63 respectively, beyond the stop switch 71. Current is supplied to the motor 9 in the same manner as shown and described in connection with Figs. 6 and 7. The contour follower is therefore moved forwardly and upwardly simultaneously.

The operation of the mechanism in effecting forward and downward movement of the contour follower at an angle of 45° or greater, as indicated at "D" and "F" in Fig. 5, will now be described in connection with Fig. 9, the movement at "D" where the contour follower is moving downwardly and forwardly being first described, and then the movement at "F" where the contour follower is moving downwardly and rearwardly. Under condition "D" the mercury column 31 is in an uppermost position bridging all three contacts 27, 28 and 29, thereby energizing the relays 45 and 48 and setting the switches 69 and 71 as shown. The supplemental switching mechanism 42 is set as shown due to engagement of the feeler arm 37 with the contour. The relay 54 is therefore deenergized, which effects movement of the shift switches 72 and 74 to the position shown; and the relay 55 is energized, thereby moving the reversing switches 70 and 73 to the positions shown. With this setting of the shift switches 72 and 73, the switching mechanism 30 controls the supply of current to the motor 9 instead of to the motor 10; and current is supplied initially to the motor 10 through conductors 66 and 67 instead of through conductors 63 and 64. The contour follower will therefore be moved constantly downwardly by the motor 10, whereas it may be moved alternately forwardly and backwardly by the motor 9. Current is supplied from one side of the line 62 through the conductor 66, switch arm 95, jumper 103, conductor 64, switch arm 109, jumper 113, and conductor 63 to the winding 61 of the motor 10, thence through the winding 61 in the direction indicated by the arrow 125 and back to the other side of the line 62 through the conductor 64, jumper 112, switch arm 106, conductor 63, jumper 104, switch arm 98, and conductor 67. The motor 10 will then rotate to move the contour follower constantly downwardly. Current is supplied from one side of the line 62 through conductor 63, switch arm 75, jumper 81, conductor 64, switch arm 92, jumper 102, conductor 67, switch arm 117, jumper 121, and conductor 66 to the winding 65 in the direction of the arrow 126, and back to the other side of the line 62 through the conductor 67, jumper 120, switch arm 114, conductor 66, jumper 101, switch arm 89, conductor 63, jumper 82, switch arm 76, and conductor 64. The motor 9 will then rotate to move the contour follower forwardly while the motor 10 is moving the contour follower downwardly. When the contour follower is moved rearwardly as indicated at "F" in Fig. 5 the column 31 will be in a lowermost position engaging only the contact 27, and the reversing switch 69 and the stop switch 71 will be in the position shown in Fig. 7, and the various other switching means will remain in the position shown in Fig. 9. Current will then be supplied to the motor 10 in the manner just described so that the motor 10 will rotate to move the contour follower constantly downwardly. Current will then be supplied from one side of the line 62 through the conductor 63, switch arm 89, jumper 101, conductor 66, switch arm 114, jumper 120, and conductor 67 to the winding 65 of the motor 9, thence through the winding 65 in the opposite direction, and back to the other side of the line 62 through the conductor 66, jumper 121, switch arm 117, conductor 67, jumper 102, switch arm 92, and conductor 64. The motor 9 will then rotate to move the contour follower rearwardly while it is being moved downwardly by the motor 10.

The operation of the mechanism in effecting forward and upward movement of the contour follower at an angle of 45° or greater as indicated at "E" and "G" in Fig. 5 will now be described in connection with Fig. 10, the movement at "E" where the contour follower is moving upwardly and forwardly being first described, and then the movement at "G" where the contour follower is moving upwardly and rearwardly. Under condition "E" the mercury column 31 is in a lowermost position engaging only the contact 27 whereby the relays 45 and 48 are deenergized and the switches 69 and 71 are in the position shown. The supplemental switching mechanism 42 is set as shown due to the engagement of the feeler arm 36 with the contour. The relays 54 and 55 are therefore both deenergized which effects movement of the shift switches 72 and 74 to the position shown, and the reversing switches 70 and 73 remain in their initial positions as shown in Figs. 6, 7, and 8. Current is then supplied from one side of the line 62 through conductor 66, switch arm 95, jumper 103, and conductor 64 to the winding 61 of the motor 10, thence through the winding 61 in a reverse direction as indicated by the arrow 128 and back to the other side of the line 62 through the conductor 63, jumper 104, switch arm 98 and conductor 67. The motor 10 therefore rotates to move the contour follower continuously upwardly. Current is supplied from one side of the line 62 through conductor 63, switch arm 89, jumper 101, and conductor 66 to the winding 65 of the motor 9, thence through the winding 65 in the direction indicated by the arrow 126, and back to the other side of the line 62 through the conductor 67, jumper 102, switch arm 92, and conductor 64. The motor 9 therefore moves the contour follower forwardly as the motor 10 moves it upwardly. When the contour follower is moved rearwardly as indicated at "G" in Fig. 5, the column 31 will be in an uppermost position engaging and bridging all three contacts 27, 28 and 29. The relays 45 and 48 will therefore be energized and the switches 69 and 71 will be in the position shown in Fig. 8. The rest of the mechanism will remain in the positions shown in Fig. 10. Current is then supplied to the winding 61 of the motor 10 in the manner just described so that the contour follower will be moved continuously upwardly. Current will then flow from one side of the line 62 through conductor 63, switch arm 75, jumper 81, conductor 64, switch arm 92, jumper 102, and conductor 67 to the winding 65 of the motor 9, and thence through the winding 65 in a reverse direction and back to the other side of the line 62 through conductor 66, jumper 101, switch arm 89, conductor 63, jumper 82, switch arm 76, and conductor 64. The motor 9 will then move the contour follower rearwardly while the motor 10 is moving it upwardly.

The manner in which the contour follower 8 is moved along contour paths under varying conditions of the contour paths in accordance with information imparted by the contour follower having been described, the manner in which the duplicating means is actuated in accordance with information supplied by the contour follower will now be described in connection with Fig. 11, in which the block 130 represents the carriage 7, the contour follower 8 and the transmission mechanisms therefore, and the various switching mechanisms shown and described in connection with Figs. 6 to 10, which collectively may be termed a sensor. The clay cutter duplicating mechanism is represented by the block 131, the plotting board duplicating mechanism is represented by the block 132, and the die cutter duplicating mechanism is represented by the block 133. The electrical output of the sensor 130 is imparted to the servo motor 9 as indicated by the line 134, and to the servo motor 10 as indicated by the line 135. The mechanical output of the servo motor 9 is imparted to the sensor 130 through suitable means indicated by the dotted line 136, to a synchro represented by the block 137 through means indicated by the dotted lines 136, 138 and 139, and to an encoder represented by the block 140 through means indicated by the dotted lines 136 and 138. The mechanical output of the servo motor 10 is imparted to the sensor 130 through suitable means indicated by the dotted lines 141 and 142, to a synchro represented by the block 143 through means indicated by the dotted lines 141 and 144, and to an encoder represented by the block 145 through means indicated by the dotted line 141. The electrical output of the synchro 137 is imparted to the plotting board mechanism 132 as indicated by the line 146, and to the clay cutter mechanism as indicated by the lines 146 and 147; and the electrical output of the synchro 143 is imparted to the clay cutter mechanism 131 as indicated by the line 148, and to the plotting board mechanism 132 as indicated by the lines 148 and 149. The clay cutter mechanism 131 and the plotting board mechanism 132 are therefore actuated in accordance with the combined outputs of the synchros 137 and 143 which in turn are actuated in accordance with information imparted thereto by the contour follower 8 through the servo motors 9 and 10. The electrical outputs of the encoders 140 and 145 are imparted to a tape recorder 150 as indicated by the lines 151 and 152 respectively; and the electrical output of the tape recorder 150 is imparted to the die cutter mechanism 133. The die cutter mechanism is therefore actuated through the tape recorder 150 in accordance with the information stored therein and imparted thereto by the encoders 140 and 145. The outputs of the encoders 140 and 145 are in accordance with the information imparted thereto by the contour follower 8 through the servo motors 9 and 10.

From the foregoing it will be apparent to those skilled in this art that we have provided a very simple and efficient method and apparatus for accomplishing the objects of the invention.

It is to be understood that we are not limited to the specific construction shown and described herein as various modifications may be made therein within the spirit of the invention and the scope of the appended claims.

What is claimed is:

1. An apparatus for duplicating three-dimensional models comprising a pressure sensitive contour follower; means by which said contour follower is moved longitudinally and vertically with respect to said model; means by which said contour follower is maintained, during movement thereof, in varying pressure engaging contact with the surface of a model being duplicated, the said pressure engaging contact varying in accordance with variations in the contour of said model and the relative movement of said contour follower with respect thereto; and duplicating means by which said model is duplicated, said contour follower being operative to transmit information by which the operations of all of said means are controlled in accordance with the position of said contour follower with respect to said model and the pressure exerted by said contour follower against said model; said pressure senstive contour follower comprising an elongated stem through which said contour follower is moved longitudinally and vertically during operation, a mercury filled hollow sphere of flexible material secured to the lower end of said stem, an elongated hollow tube carried by said stem with the lower open end thereof disposed within said sphere, and switch means comprising a plurality of vertically spaced contacts mounted in fixed position within said hollow tube, said sphere being operative when deformed by pressure being applied thereto to force mercury from said sphere up into said hollow tube into bridging engagement with one or more of said contacts depending on the amount of pressure applied to said sphere, and said switch means being operative to control the movement of said contour follower in accordance with the amount of pressure applied to said sphere and to control the operation of said duplicating means.

2. A duplicating apparatus as defined in claim 1 in which the upper end of said hollow tube terminates in an enlarged pressure reducing and expansion chamber.

3. A duplicating apparatus as defined in claim 2 in which adjusting means are provided by which the height of mercury in said hollow tube may be manually adjusted when no pressure is being applied to said sphere.

4. A duplicating apparatus as defined in claim 1 in which a memory device is also provided in which the information transmitted by said contour follower may be stored for use at some future time in duplicating said model.

5. A duplicating apparatus as defined in claim 1 in which said contour follower also includes a pair of mechanical feelers and a supplemental switch mechanism which is adapted to be actuated by said mechanical feelers under certain predetermined conditions of the contour of said model, said suplemental switch mechanism being operative, in conjunction with said switch means, when actuated by said mechanical feelers, to control the movement of said contour follower and the operation of said duplicating means.

References Cited in the file of this patent

UNITED STATES PATENTS

| | | |
|---|---|---|
| 2,410,295 | Kuehni et al. | Oct. 29, 1946 |
| 2,537,770 | Livingston et al. | Jan. 9, 1951 |
| 2,837,707 | Stokes | June 3, 1958 |